US011131148B2

(12) United States Patent
Ricks (10) Patent No.: US 11,131,148 B2
(45) Date of Patent: Sep. 28, 2021

(54) SEAL ASSEMBLY FOR USE IN EARTH-BORING ROTARY TOOLS IN SUBTERRANEAN BOREHOLES AND RELATED METHODS

(71) Applicant: Baker Hughes Oilfield Operations LLC, Houston, TX (US)

(72) Inventor: Gregory L. Ricks, Spring, TX (US)

(73) Assignee: Baker Hughes Oilfield Operations LLC, Houston, TX (US)

( * ) Notice: Subject to any disclaimer, the term of this patent is extended or adjusted under 35 U.S.C. 154(b) by 137 days.

(21) Appl. No.: 16/455,229

(22) Filed: Jun. 27, 2019

(65) Prior Publication Data

US 2020/0408044 A1 Dec. 31, 2020

(51) Int. Cl.
*E21B 10/25* (2006.01)
*F16J 15/34* (2006.01)

(52) U.S. Cl.
CPC .......... *E21B 10/25* (2013.01); *F16J 15/3484* (2013.01); *F16J 15/3496* (2013.01)

(58) Field of Classification Search
CPC ........ E21B 10/25; F16J 15/3484; F16J 15/34; F16J 15/3436; F16J 15/344
See application file for complete search history.

(56) References Cited

U.S. PATENT DOCUMENTS

| 3,862,762 | A | 1/1975 | Millsap | |
|---|---|---|---|---|
| 6,026,917 | A | 2/2000 | Zaharadnik et al. | |
| 6,142,249 | A | 11/2000 | Zahradnik et al. | |
| 7,413,037 | B2 | 8/2008 | Lin et al. | |
| 9,157,280 | B2 | 10/2015 | Lin et al. | |
| 9,249,629 | B2 | 2/2016 | Lin et al. | |
| 2004/0031624 | A1 | 2/2004 | Scott et al. | |
| 2006/0060359 | A1* | 3/2006 | Lin ........................ | E21B 10/25 166/371 |
| 2008/0257610 | A1* | 10/2008 | Koltermann ............ | E21B 10/25 175/371 |
| 2014/0225327 | A1* | 8/2014 | Lin ........................ | E21B 10/25 277/390 |

* cited by examiner

*Primary Examiner* — Robert E Fuller
*Assistant Examiner* — Theodore N Yao
(74) *Attorney, Agent, or Firm* — TraskBritt (57) ABSTRACT

An earth-boring rotary tool includes a body comprising a pin, a roller cone mounted on the pin, and a seal assembly disposed between the pin and the roller cone. The seal assembly includes a seal ring to form a seal between the seal ring and the roller cone. The seal assembly includes a first polymer ring, while compressed, applies a first force on the seal ring that biases the seal ring towards the roller cone. The seal assembly includes a second polymer ring proximate the first polymer ring. The second polymer ring, while compressed, applies a second force on the seal ring to further bias the seal ring towards the roller cone. The second force is greater than the first force.

18 Claims, 8 Drawing Sheets

FIG. 7

SEAL ASSEMBLY FOR USE IN EARTH-BORING ROTARY TOOLS IN SUBTERRANEAN BOREHOLES AND RELATED METHODS

TECHNICAL FIELD

Embodiments of the present disclosure generally relate to devices and methods involving cutting and other rotatable elements for earth-boring tools used in earth boring operations and, more specifically, to a metal face seal in a seal assembly for earth-boring rotary tools, and to related methods.

BACKGROUND

Rotary drill bits, such as roller cone bits, are commonly used in forming bore holes or wells in earth formations. A typical roller cone earth boring bit has three cones that roll around a common axis. The cones are mounted to bearing pins that depend from head sections. A seal assembly contains lubricant within the cavity of the cone surrounding the bearing pin.

In particular, the seal assembly includes a seal ring that is biased against an internal surface of a roller cone to form a metal face seal. A first polymer ring (also referred to as an energizer), when compressed, provides the primary force (or primary face load on the metal face seal). A second polymer ring, when compressed, provides a lesser secondary force (or lesser face load, such as 20-40% of the total face load), as compared to the primary force generated by the first polymer ring. In other words, the second polymer ring "backs up" the first polymer ring with respect to providing a face load to the metal face seal. Accordingly, the second polymer ring is also referred to as a backup ring (BUR).

The primary function of the secondary polymer ring is stopping ingress of matter in the surrounding drilling environment (e.g., mud, drilling debris, etc.) into a cavity between the metal face seal components and the base area of the bearing pin. Typically, the material of the secondary polymer ring has a low Shore A hardness to meet various design requirements of the seal assembly. As a result, the second polymer ring is susceptible to damage (e.g., tearing). Accordingly, the reliability of the rotary drill bit, as a whole, is reduced.

BRIEF SUMMARY

In additional embodiments, the present disclosure includes an earth-boring rotary tool that includes a body comprising at least one pin, at least one roller cone mounted on the at least one pin and configured to rotate about the at least one pin during use of the earth-boring rotary tool, and at least one seal assembly disposed between the at least one pin and the at least one roller cone. The at least one seal assembly includes a seal ring configured to remain stationary with respect to rotation of the at least one roller cone. The seal ring comprising a distal surface proximate a surface of the at least one roller cone to form a seal between the distal surface of the seal ring and the surface of the at least one roller cone. The seal ring is comprised of a metal. The at least one seal assembly further includes first polymer ring disposed radially inward the seal ring. The first polymer ring configured to remain stationary with respect to rotation of the at least one roller cone and, while compressed in a non-use state, applying a first force on the seal ring that biases the distal surface of the seal ring towards the surface of the at least one roller cone. The at least one seal assembly further includes a second polymer ring adjacent a proximal surface of the seal ring. The first polymer ring configured to remain stationary with respect to rotation of the at least one roller cone and, while compressed in the non-use state, applying a second force on the seal ring that biases the distal surface of the seal ring towards the surface of the at least one roller cone. The second force is greater than the first force.

In some embodiments, the present disclosure includes an earth-boring rotary tool that includes a body comprising at least one pin, at least one roller cone mounted on the at least one pin and configured to rotate about the at least one pin during use of the earth-boring rotary tool, and at least one seal assembly disposed between the at least one pin and the at least one roller cone. The at least one seal assembly includes a seal ring configured to remain stationary with respect to rotation of the at least one roller cone. The seal ring includes a distal surface proximate a surface of the at least one roller cone to form a seal between the distal surface of the seal ring and the surface of the at least one roller cone. The at least one seal assembly includes a first polymer ring disposed radially inward the seal ring. The first polymer ring configured to remain stationary with respect to rotation of the at least one roller cone and to bias the distal surface of the seal ring towards the surface of the at least one roller cone. The at least one seal assembly also includes a second polymer ring proximate the first polymer ring. The second polymer ring is configured to further bias the distal surface of the seal ring towards the surface of the at least one roller cone. The first polymer ring, when applying the bias, has a first cross-sectional length, the first cross-sectional length between a distal end and a proximal end of a cross-section of the first polymer ring, and the second polymer ring, when applying the bias, includes a second cross-sectional length, the second cross-sectional length is between an inner end and an outer end of a cross-section of the second polymer ring, and wherein the second cross-sectional length is less than the first cross-sectional length.

Further embodiments of the present disclosure include a method for mounting a roller cone on a body of an earth-boring rotary tool. The method includes disposing a first polymer ring, a second polymer ring and a seal ring in a cavity between a roller cone and pin of an earth-boring rotary tool. The first polymer ring is disposed radially inward the seal ring and the second polymer ring is disposed proximate a proximal surface of the first polymer ring and a proximal surface of the seal ring. The method further includes translating a roller cone towards the pin along an axis of the pin to mount the roller cone on the pin. The method also includes in response to the translating compressing the first polymer ring against the seal ring. The compressing of the first polymer ring generates a first force applied on the seal ring that biases a distal surface of the seal ring towards an internal surface of the roller cone to form a seal between the distal surface of the seal ring and the internal surface of the roller cone. Also, in response to the translating, compressing the second polymer ring against the seal ring. The compressing of the second polymer ring generates a second force applied on the seal ring that biases the distal surface of the seal ring towards the internal surface of the roller cone to further form the seal between the distal surface of the seal ring and the internal surface of the roller cone. The second force is greater than the first force.

BRIEF DESCRIPTION OF THE DRAWINGS

While the specification concludes with claims particularly pointing out and distinctly claiming embodiments of the present disclosure, the advantages of embodiments of the disclosure may be more readily ascertained from the following description of embodiments of the disclosure when read in conjunction with the accompanying drawings in which:

DETAILED DESCRIPTION

The illustrations presented herein are not meant to be actual views of any particular earth-boring tool, rotatable cutting element or component thereof, but are merely idealized representations employed to describe illustrative embodiments. The drawings are not necessarily to scale.

The embodiments disclosed relate generally to rotatable or otherwise moveable devices or elements (e.g., rotatable cutting elements) for earth-boring tools that may move in order to alter the positioning of the cutting element relative to an earth-boring tool to which the cutting element is coupled. For example, such a configuration may enable the cutting element to crush and gouge a rock formation due to the rolling motion of the cutting element. Embodiments of the disclosure include a seal or seal assembly. The seal or seal assembly may be configured to seal a lubricant in a cavity between a roller cone and pin that the roller cone is mounted to. Such seals or seal assemblies may also be utilized to prevent debris from entering the cavity between the roller cone and the pin.

As used herein, the term "substantially" in reference to a given parameter means and includes to a degree that one skilled in the art would understand that the given parameter, property, or condition is met with a small degree of variance, such as within acceptable manufacturing tolerances. For example, a parameter that is substantially met may be at least about 90% met, at least about 95% met, or even at least about 99% met.

Figure 1A:
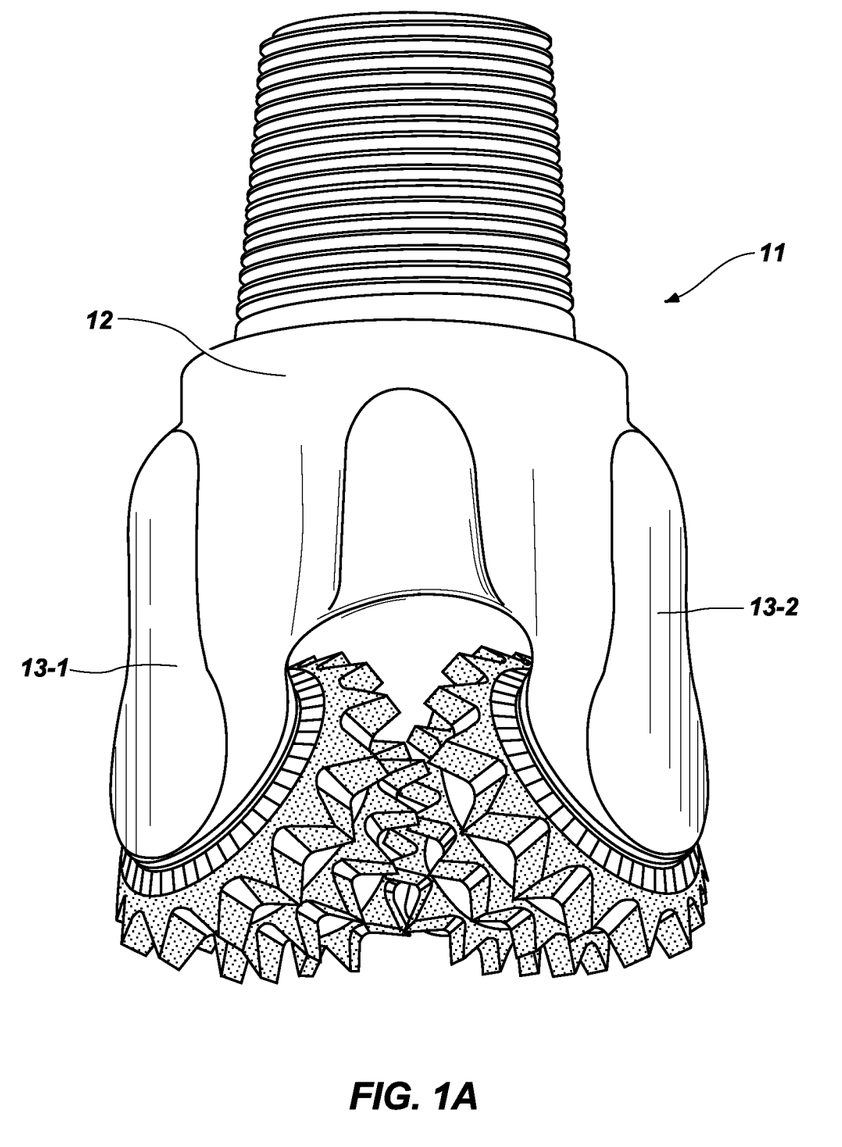
FIG. 1A is an isometric view of an earth-boring bit in accordance with an embodiment of the present disclosure.

FIG. 1A illustrates an earth-boring downhole rotary tool in the form of a roller cone drill bit 11, which has a bit body 12 having three legs (e.g., a first leg 13-1, a second leg 13-2, and a third leg (not shown)). In other embodiments, the drill bit 11 may have more or less legs.

Figure 1B:
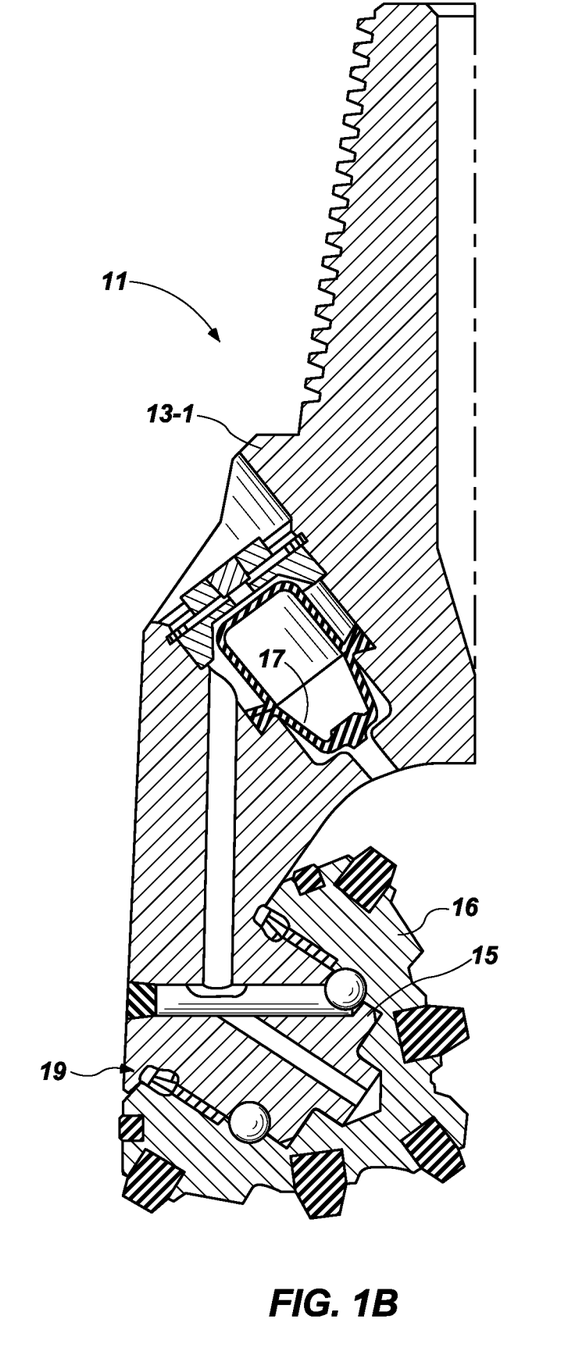
FIG. 1B is a partial, longitudinal cross-sectional view of a portion of the earth-boring bit illustrated FIG. 1A having a seal assembly in accordance with an embodiment of the present disclosure.

FIG. 1B illustrates a partial, longitudinal cross-sectional view of a portion of the drill bit 11 illustrated FIG. 1A. Each bit leg (e.g., first leg 13-1) has a depending bearing pin 15. A roller cone 16 is rotatably mounted on each bearing pin 15. A seal assembly 19 includes a metal face seal that is disposed between each roller cone 16 and each bearing pin 15 and seals lubricant within a cavity between the cone 16 and the respective bearing pin 15 on which it is mounted. Additionally, the seal assembly 19 also prohibits drilling debris (e.g., drilling fluid, mud, cuttings, etc.) from entering the cavity of the cone 16 that surrounds the bearing pin 15. A compensator 17 is in communication with the lubricant for equalizing the pressure of the lubricant with the drilling fluid hydrostatic pressure on the exterior of bit 11.

Figure 2:
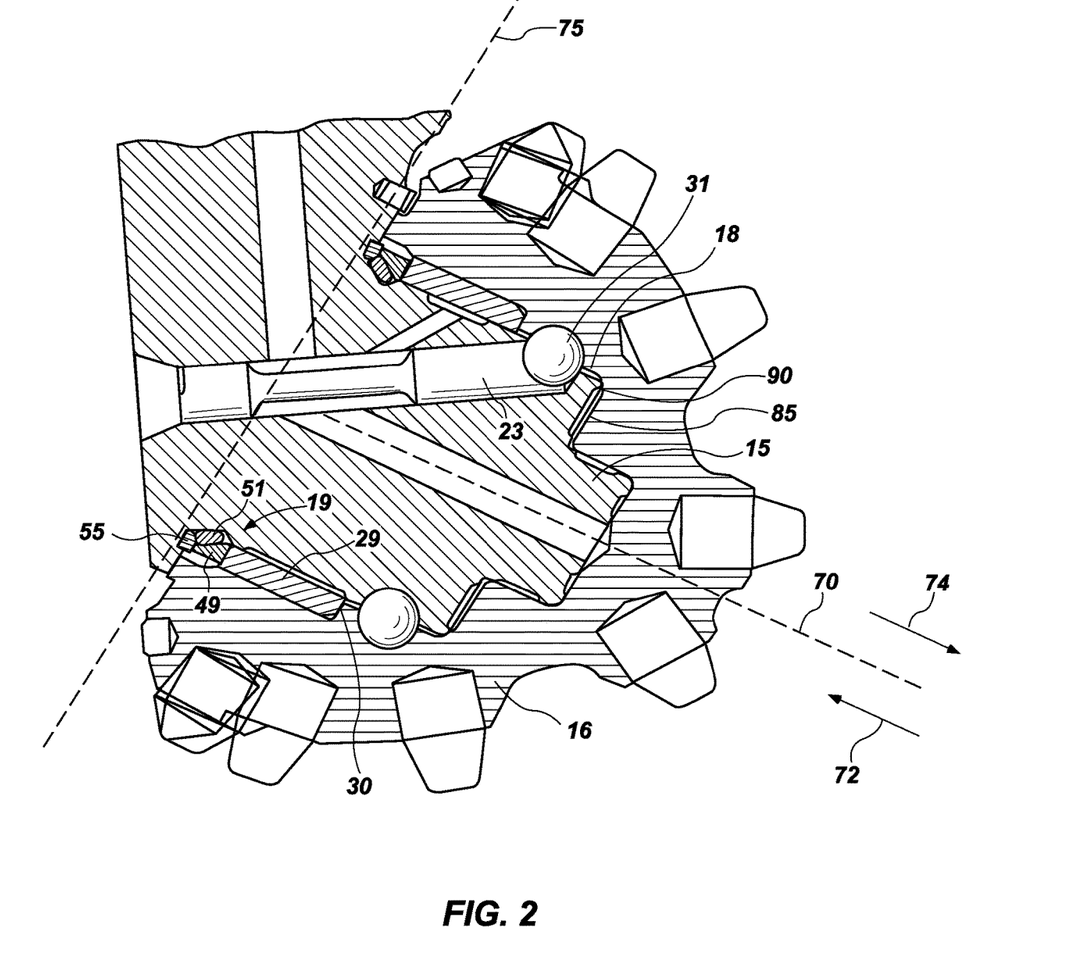
FIG. 2 is a partial, enlarged and more detailed cross-sectional view of the seal assembly illustrated in FIG. 1B between a pin and a roller cone, in an assembled state, in accordance with an embodiment of the present disclosure.
Figure 3:
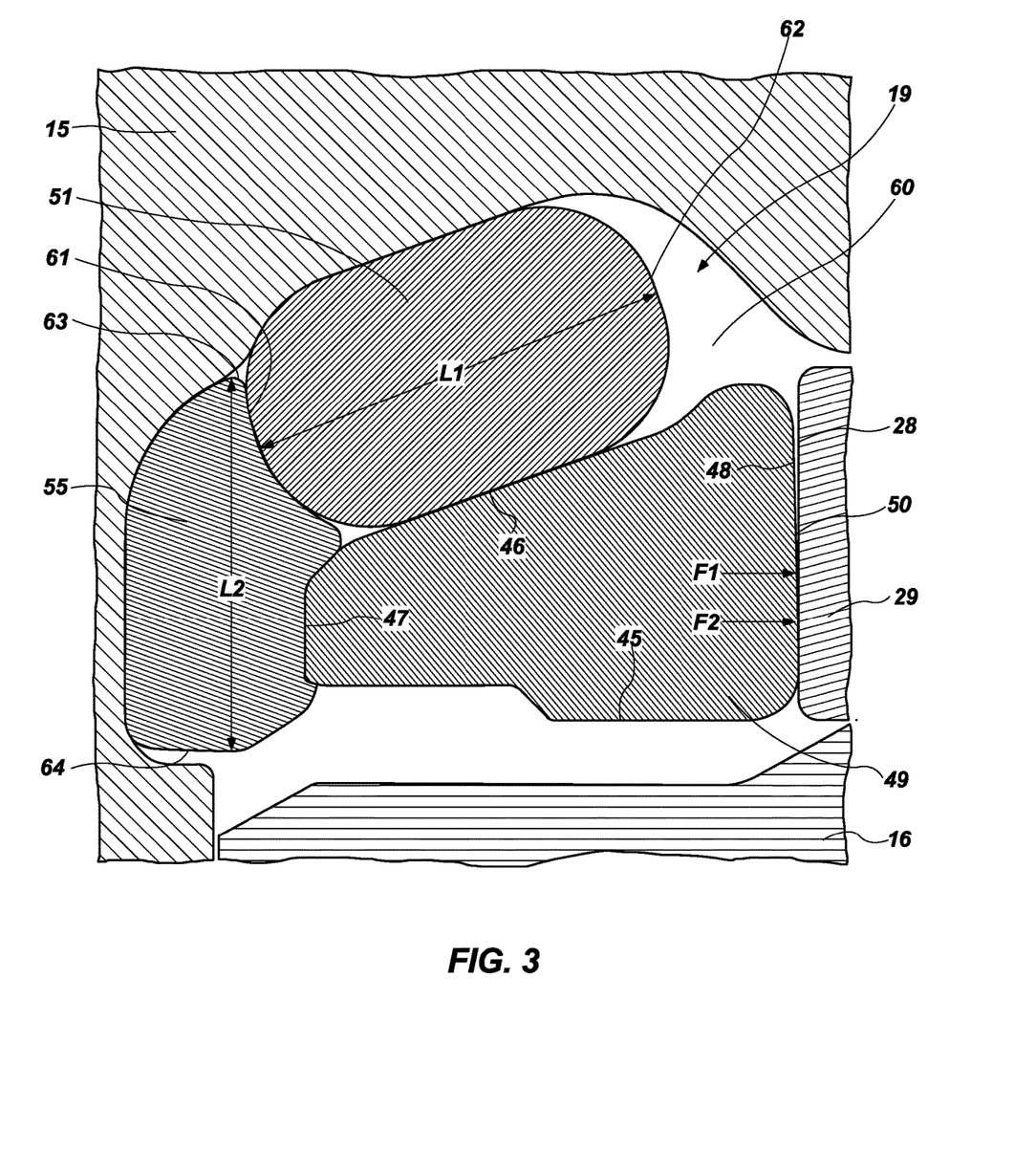
FIG. 3 is an enlarged cross-sectional view of the seal assembly illustrated in FIG. 2, in accordance with an embodiment of the present disclosure.

FIGS. 2 and 3 are enlarged cross-sectional views of the seal assembly 19 between the roller cone 16 and the pin 15. FIGS. 2 and 3 depicts the roller cone 16 mounted onto the bearing pin 15. In particular, an internal cavity 18 of the roller cone 16 is defined by internal surfaces of the roller cone 16. The pin 15 extends into the internal cavity 18. As such, the roller cone 16 and the bearing pin 15 are in an assembled state.

During mounting (or assembling) of the cone 16 on the bearing pin 15, the cone 16 is pressed onto the pin 15 in a first axial direction 72 toward the base on the pin 15. The cone 16 moves in the first axial direction 72 until an internal surface of the cone 16 (e.g., the planar surface 85) seats against a surface of the pin 15 (e.g., the planar surface 90). In the assembled state, the roller cone 16 is retained on the pin 15 by a plurality of ball bearings 31. The ball bearings are inserted into a raceway between the cone 16 and the pin 15 through a passageway, which is then plugged with a ball plug 23, which retains the ball bearings 31 in the raceway between the roller cone 16 and the pin 15. When assembled, the roller cone 16 is co-axial with pin 15 and capable of rotating about the axis 70 of the pin 15.

Additionally, when the roller cone 16 is mounted on the pin 15, the seal assembly 19 is also in an assembled state. The seal assembly 19, as described above, is configured to retain lubricant within a cavity 60, which forms a seal therein between the roller cone 16 and the pin 15 and hinders entry of debris into the cavity.

The seal assembly 19, in one embodiment, includes a seal ring 49, a first polymer ring 51 (e.g., an O-ring and also referred to in the art an energizer or energizer ring), and a second polymer ring 55 (also referred to in the art as a backup ring (BUR)). The seal assembly 19 may also include an annular or cylindrical insert ring 29.

A distal surface 48 of the seal ring 49 abuts against a proximal surface 28 of the insert ring 29 to form a metal face seal 50. In particular, the metal face seal 50 is configured to retain lubricant within the cavity 60. The terms "proximal" and "distal" as described herein are referenced with respect to a base of the pin 15, which is illustrated in FIG. 2 by the plane 75, which extends through the base of the pin 15 perpendicularly to the axis 70. The seal ring 49 has a distal surface 48 (e.g., distal with respect to the plane 75) and a proximal surface 47 (e.g., proximal with respect to the plane 75). Similarly, the insert ring 29 includes a proximal surface 28 (e.g., proximal with respect to the plane 75) and an opposite distal surface 30 (e.g., distal with respect to the plane 75).

In one embodiment, the insert ring 29 and the seal ring 49 are comprised of a metal and may have the same or different chemical compositions. As such, the seal 50 is a metal face seal. In additional embodiments, the bit 11 may not include an insert ring 29, and the seal 50 may be established between distal surface 48 of the seal ring 49 and an internal surface of the roller cone 16.

The seal 50 is a dynamic seal in that the insert ring 29 rotates with the roller cone 16, while the seal ring 49 remains stationary with respect to pin 15 while the roller cone 16 rotates about the pin 15. As such, the proximal surface 28 of the insert ring 29 rotates while the distal surface 48 of the seal ring remains stationary. Additionally, the first polymer ring 51 and the second polymer ring 55 also remain stationary while roller cone 16 rotates about pin 15.

As described above, in conventional seal assemblies, a first polymer ring (e.g., an energizer ring) is comprised of a first material (e.g., HNBR) and a second polymer ring (e.g., BUR) is comprised of a second different material (e.g., nitrile butadiene rubber (NBR)). As such, the second polymer ring has a lower shore A hardness (on the Rockwell hardness scale) than the first polymer ring. The low shore A hardness value of the second polymer ring (e.g., BUR) increases the susceptibility of the second polymer ring to damage (e.g., tearing). Accordingly, the reliability of the rotary drill bit, as a whole, is reduced.

In contrast to conventional seal assemblies, the first polymer ring 51 and the second polymer ring 55 are comprised of a polymer and may have the same or different chemical compositions. For example, the first polymer ring 51 and the second polymer ring 55 are each comprised of, but not limited to, hydrogenated nitrile butadiene rubber (HNBR), perfluoroelastomer (FFKM) or fluoroelastomer (FKM). Additionally, in one embodiment, the first polymer ring 51 and the second polymer ring 55 have the same hardness on the Rockwell hardness scale. As a result, the second polymer ring 55 is less susceptible to damage (e.g., tearing). The first polymer ring 51 and second polymer ring 55 may have shore A hardness in the range of 50-90.

In one embodiment, a tensile strength (e.g., ultimate tensile strength) of the second polymer ring 55 is about 1550 pounds per square inch (PSI). Tensile strengths for the first polymer ring 51 and the second polymer ring 55 may be in a range of about 1400 psi to 3000 psi.

As depicted in FIGS. 2 and 3, the first polymer ring 51 is compressed against the inner surface 46 of the seal ring 49 (when the roller cone 16 is mounted on the pin 15). The terms "inner" or "inwardly" and "outer" or "outwardly" as described herein are referenced with respect to the axis 70 which is the center axis of the pin 15. For example, the seal ring 49 includes an inner surface 46 (e.g., inward with respect to the axis 70) and an outer surface 45 (e.g., outward with respect to the axis 70). The compression of the first polymer ring 51 on the inner surface 46 of the seal ring 49 biases (or urges) the distal surface 48 of the seal ring 49 towards the proximal surface 28 of the insert ring 29 (to form seal 50). In particular, the biasing of the first polymer ring 51 against the seal ring 49 generates a force, F1, (e.g., a first face load) on the seal 50.

Similarly, the second polymer ring 55 is compressed against the proximal surface 47 of the seal ring 49 (when the roller cone 16 is mounted on the pin 15). The compression of the second polymer ring 55 on the inner surface 46 of the seal ring 49 biases (or urges) the distal surface 48 of the seal ring 49 towards the proximal surface 28 of the insert ring 29 (to form the seal 50). In particular, the biasing of the second polymer ring 55 against the seal ring 49 generates a force, F2, (e.g., a second face load) on the seal 50. As a result, a total force on the seal 50 (e.g., total face load) is the sum of the force, F1, and the force, F2 (e.g., the sum of the first face load and the second face load).

As described above, in conventional seal assemblies, a first polymer ring (e.g., energizer ring) generates a force (or face load) on a metal face seal that is greater than the force (or face load) generated by a second polymer ring (e.g., BUR). For example, the first polymer ring accounts for 80-60% of the total force (e.g., total face load) exerted on the metal face seal, while the second polymer ring accounts for 20-40% of the total force (e.g., total face load) exerted on the metal face seal. The lower force generated by the second polymer ring, is based in part, on the lower Rockwell hardness of the second polymer ring as compared to the higher Rockwell hardness of the first polymer ring.

In contrast to conventional seal assemblies, in one embodiment, force, F2 (generated by the second polymer ring 55) is greater than the force, F1 (generated by the first polymer ring 51). For example, the force, F2 (generated by the second polymer ring 55) accounts for 50-70% of the total force exerted on the seal 50, while the force, F1 (generated by the first polymer ring 51) accounts for 30-50% of the total force exerted on the seal 50. In one embodiment, a range of a ratio between the force, F2 and the force, F1, is about 1 to 3.

It should be appreciated that when the roller cone 16 is mounted on pin 15, the seal assembly 19 is in an assembled state. When in an assembled state, the first polymer ring 51 and the second polymer ring 55 are compressed, as depicted in at least FIGS. 2 and 3. Additionally, it should be appreciated that the seal assembly 19, as depicted in FIGS. 2 and 3, is in a non-use state. That is, the earth-boring drilling tool that includes, among other things, the roller cone 16, the pin 15 and the seal assembly 19 is not in the act of boring/drilling. As such, the face load at the seal 50 is generated by the first polymer ring 51 and the second polymer ring 55 and does not include any other forces/loads such as load occurring during drilling. It should be appreciated that forces of drilling may have a negligible effect on the load at the seal face because the majority of the drilling load would be carried by, for example, planar surfaces 85 and 90 and the journal surfaces. During drilling, the face load could be affected by hydrostatic pressure from the column of drilling fluid.

In one embodiment, when the roller cone 16 is mounted on the pin 15, a cross-sectional length, L2, of the second polymer ring 55 is less than a cross-sectional length, L1, of the first polymer ring 51. A length, L1, is the distance between the distal end 62 and the proximal end 61 of the first polymer ring 51. A length, L2, is the distance between the inner end 63 and the outer end 64 of the second polymer ring 55.

As depicted in FIGS. 2 and 3, when the roller cone 16 is mounted on the pin 15, a cross-section of the first polymer ring 51 comprises a first area and a cross-section of the second polymer ring 55 comprises a second area that is smaller than the first area. For example, a ratio of a cross-sectional area of the first polymer ring 51 to the cross-sectional area of the second polymer ring 55 is in a range of about 1.5 to 1.9. In one embodiment, a cross-sectional area of the first polymer ring 51 is in a range of about 0.020 to 0.025 in.$^2$ (13 to 16 mm$^2$).

Figure 4:
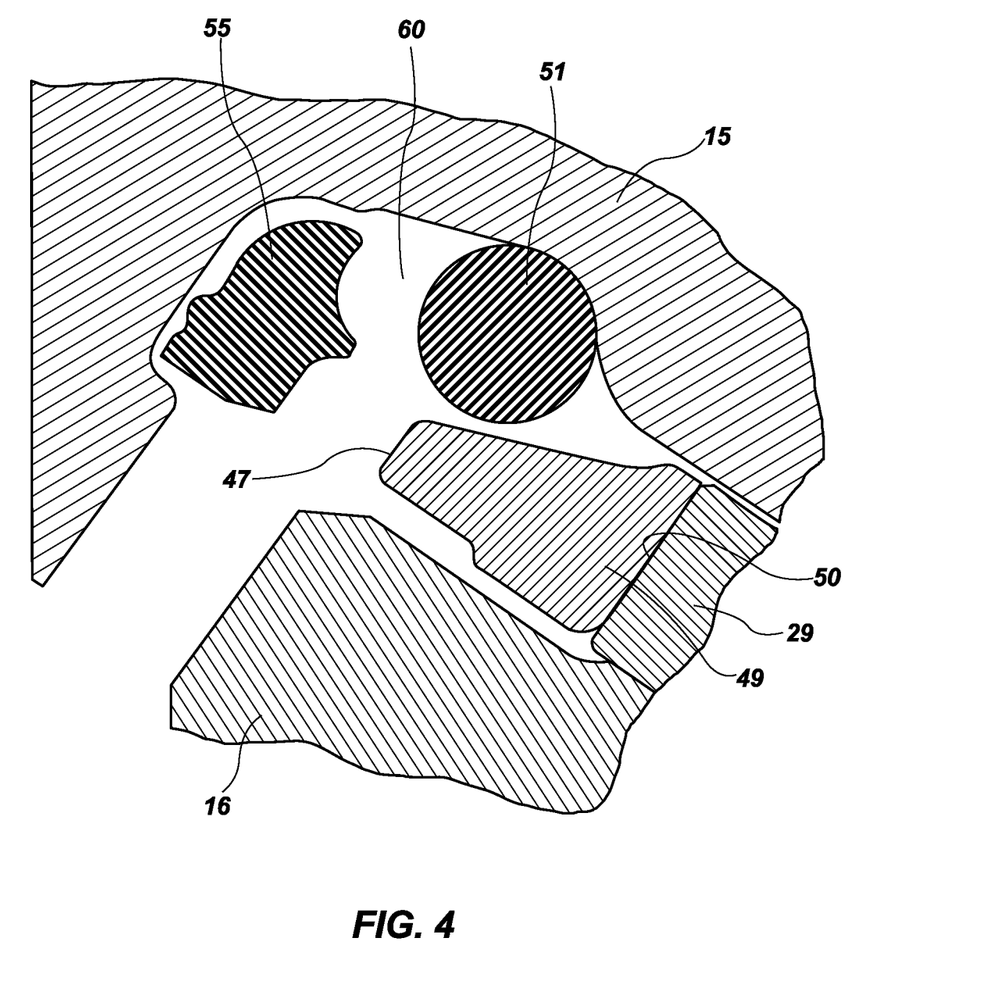
FIG. 4 is a cross-sectional view of the seal assembly illustrated in at least FIGS. 2 and 3, in an unassembled state, in accordance with an embodiment of the present disclosure.

FIG. 4 depicts a cross-sectional view of the seal assembly 19, in an unassembled state, prior to mounting the roller cone 16 on pin 15. It is noted that the first polymer ring 51, the second polymer ring 55 and the seal ring 49 are disposed in a cavity 60 between the roller cone 16 and the pin 15. The first polymer ring 51 is disposed radially inward the seal ring 49 (with respect to axis 70, as shown in FIG. 2) and the second polymer ring 55 is disposed proximate to the proximal surface 47 of the seal ring 49. In the unassembled state, the first polymer ring 51 and the second polymer ring 55 are not compressed. As such, the first polymer ring 51 and the second polymer ring 55 do not bias the seal ring 49 towards the insert ring 29. In particular, the first polymer ring 51 and the second polymer ring 55 do not provide a force, alone or in combination, on the seal 50.

Figure 5:
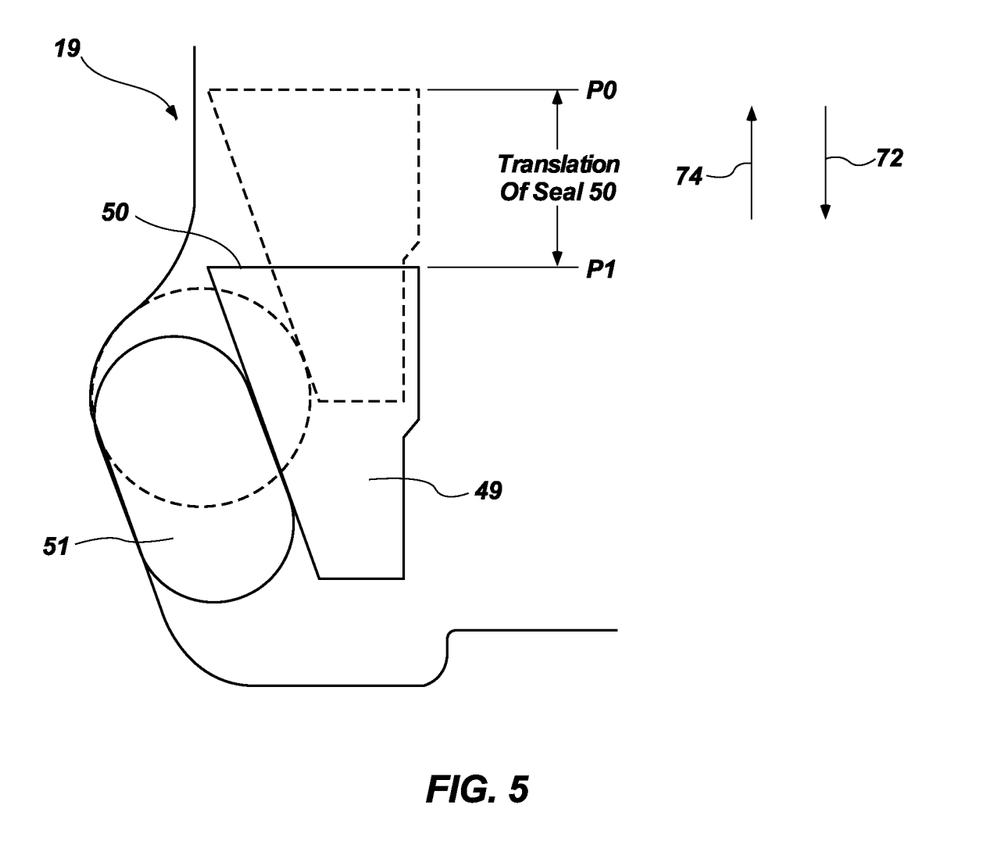
FIG. 5 is a schematically illustrated cross-sectional view of a portion of a seal assembly and illustrates translational movement of components of the seal assembly responsive to application of forces during assembly of the bit, in accordance with an embodiment of the present disclosure.

FIG. 5 is a schematically illustrated cross-sectional view of a portion of the seal assembly 19. FIG. 5 also illustrates a translational movement of seal 50 responsive to application of forces during assembly of the bit 11. For the sake of clarity and brevity, FIG. 5 only depicts the first polymer ring 51 and the seal ring 49 of the seal assembly 19. The translation of the seal 50 is from (1) an unassembled state of the seal assembly 19 (dashed lines) to (2) an assembled state of the seal assembly 19 (solid lines), and vice versa. In other words, FIG. 5 depicts a translation of the seal 50 of the seal assembly 19 from (1) a state when the roller cone 16 is not mounted on the pin 15 (see FIG. 4) to (2) a state when the roller cone 16 is mounted on the pin 15 (see FIGS. 1-3). In particular, referring to FIGS. 2 and 5, the translation of the seal 50 is along the axis 70. Additionally, the seal 50 translates in the axial direction 72 (from a position, P0, to a position, P1) when the roller cone 16 is urged towards the pin 15 and mounted on the pin 15. In contrast, the seal 50 translates in an axial direction 74 (from the position, P1, to the position, P0) when the roller cone 16 is pulled away from the pin 15 and disassembled from the pin 15.

Figure 6:
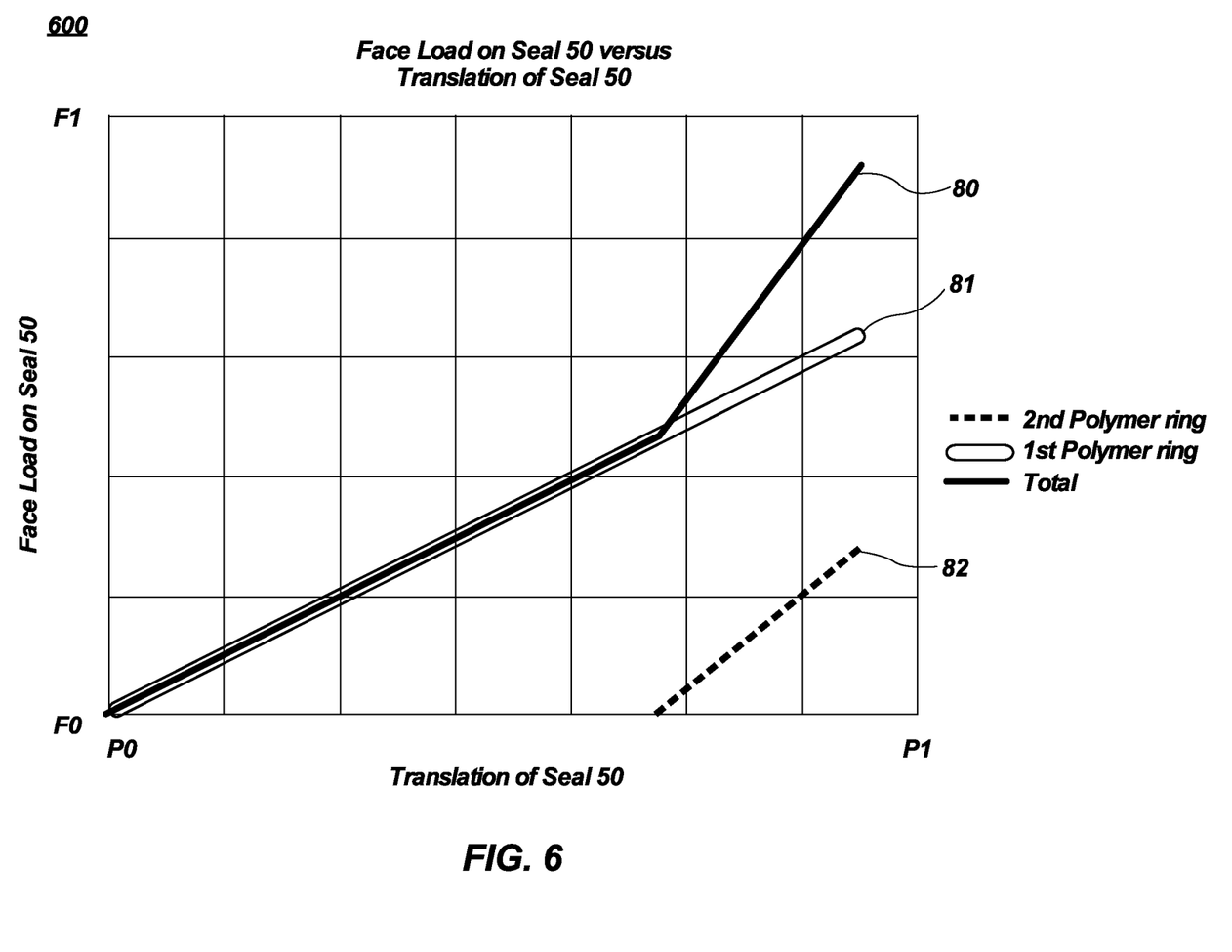
FIG. 6 is a graph of face load on a metal face seal versus translation of the metal face seal using conventional polymer rings, in accordance with an embodiment of the present disclosure.

FIG. 6 depicts a generalized graph 600 of a face load (e.g., force) on the seal 50 versus the translation of the seal 50 based on use of a conventional first polymer ring (e.g., conventional energizer ring) and a conventional second polymer ring (e.g., conventional BUR). The x-axis of the graph 600 is the translation of the seal 50 from the position, P0, (e.g., the roller cone 16 is not mounted on the pin 15) to the position, P1 (e.g., the roller cone 16 is mounted on the pin 15).

The y-axis of the graph 600 is the face load (or force) exerted on the seal 50 based on the biasing of the conventional first polymer ring and/or the conventional second polymer ring on the seal ring 49. In particular, the face load, F0, is the load/force on the seal 50 when the roller cone 16 is not mounted on the pin 15, and the face load, F1, is the load/force on the seal 50 when the roller cone 16 is mounted on the pin 15.

Graph 600 includes the curves 80, 81 and 82. The curve 81 represents a face load on the seal 50 generated by the conventional first polymer ring while the seal 50 translates from the position, P0, to the position, P1. The curve 81 is represented as a straight line, however, in various embodiments, the curve 81 may be non-linear. Additionally, the curve 81 represents a face load on the seal 50 generated by the conventional first polymer ring 51 without consideration of the face load generated by the conventional second polymer ring.

The curve 82 represents a face load on the seal 50 generated by the conventional second polymer ring while the seal 50 translates from the position, P0, to the position, P1. The curve 82 is represented as a straight line, however, in various embodiments, the curve 82 may be non-linear. Additionally, the curve 82 represents a face load on the seal 50 generated by the conventional second polymer ring without consideration of the face load generated by the conventional first polymer ring.

The curve 80 represents a face load on the seal 50 generated by the combination of the conventional first polymer ring and the conventional second polymer ring while the seal 50 translates from the position, P0, to the position, P1. As depicted, a face load increases while the seal 50 translates from the position, P0 to the position, P1. In particular, as depicted, the conventional first polymer ring makes contact with the seal ring 49 (and generates a face load on seal 50) before the conventional second polymer ring makes contact with the seal ring 49 (and generates an additional face load on seal 50). Additionally, as depicted, the conventional second polymer ring generates a face load less than a face load generated by the conventional first polymer ring. The face load, F1, is the total face load on the seal 50 (generated by both the conventional first polymer ring and the conventional second polymer ring while in an assembled state) when the roller cone 16 is mounted on the pin 15.

Figure 7:
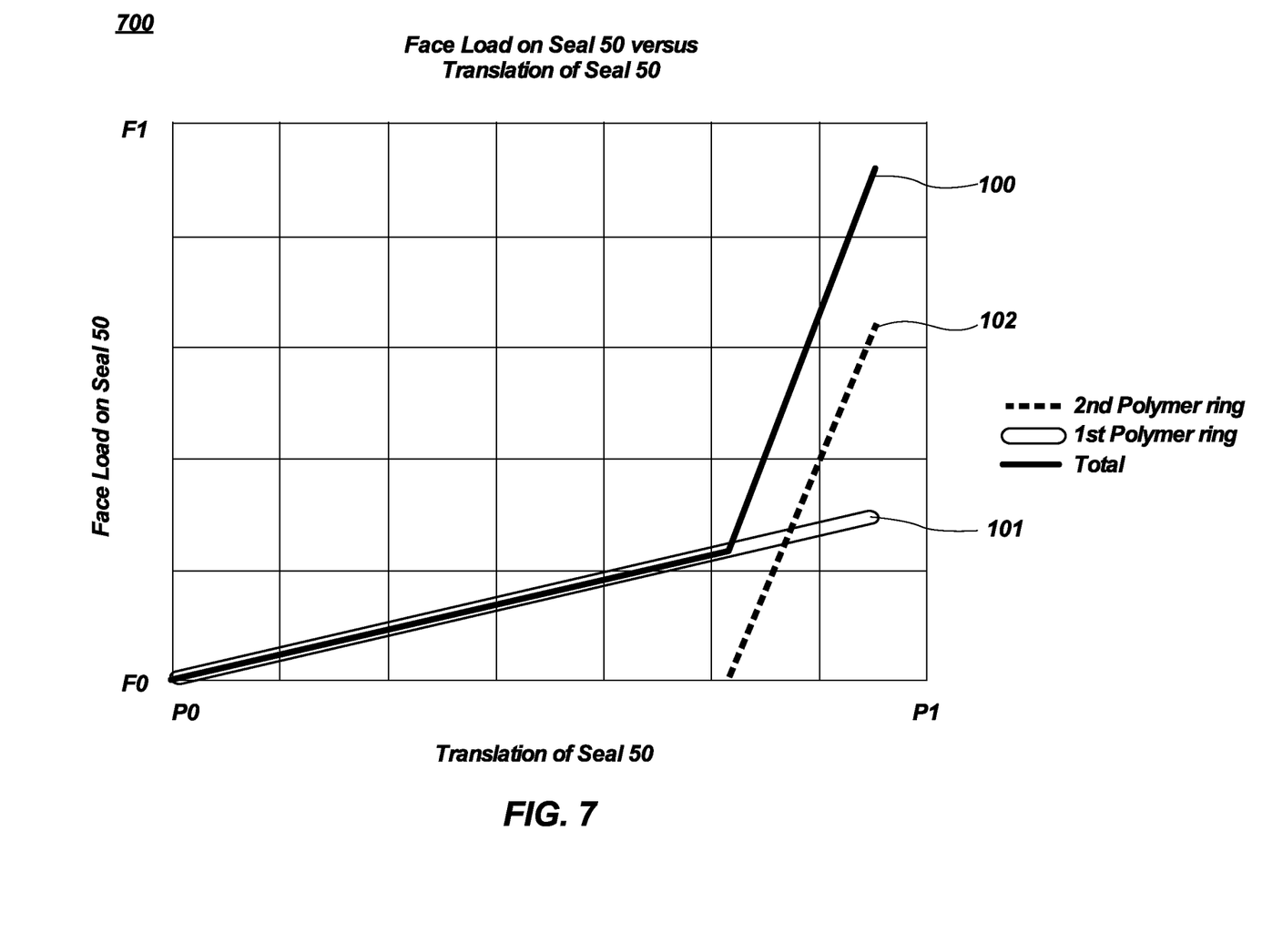
FIG. 7 is a graph of face load on a metal face seal versus translation of the metal face seal as illustrated in FIG. 5, in accordance with an embodiment of the present disclosure.

FIG. 7 depicts a generalized graph 700 of a face load (e.g., force) on the seal 50 versus the translation of the seal 50. The x-axis of the graph 700 is the translation of the seal 50 from the position, P0, (e.g., the roller cone 16 is not mounted on the pin 15) to the position, P1 (e.g., the roller cone 16 is mounted on the pin 15).

The y-axis of the graph 700 is the face load (or force) exerted on the seal 50 based on the biasing of the first polymer ring 51 and/or the second polymer ring 55 on the seal ring 49. In particular, the face load, F0, is the load/force on the seal 50 when the roller cone 16 is not mounted on the pin 15, and the face load, F1, is the load/force on the seal 50 when the roller cone 16 is mounted on the pin 15.

Graph 700 includes the curves 100, 101 and 102. The curve 101 represents a face load on the seal 50 generated by the first polymer ring 51 while the seal 50 translates from the position, P0, to the position, P1. The curve 101 is represented as a straight line, however, in various embodiments, the curve 101 may be non-linear. Additionally, the curve 101 represents a face load on the seal 50 generated by the first polymer ring 51 without consideration of the face load generated by the second polymer ring 55.

The curve 102 represents a face load on the seal 50 generated by the second polymer ring 55 while the seal 50 translates from the position, P0, to the position, P1. The curve 102 is represented as a straight line, however, in various embodiments, the curve 102 may be non-linear. Additionally, the curve 102 represents a face load on the seal 50 generated by second polymer ring 55 without consideration of the face load generated by the first polymer ring 51. A slope of the curve 102 is greater than a slope of the curve 101. In one embodiment, a range of a ratio of the slope of curve 102 and the slope of curve 101 is about 5 to 15. In another embodiment, a ratio of the slope of curve 102 and the slope of curve 101 is greater than 4.

The curve 100 represents a face load on the seal 50 generated by the combination of the first polymer ring 51 and the second polymer ring 55 while the seal 50 translates from the position, P0, to the position, P1. As depicted, a face load increases while the seal 50 translates from the position, P0 to the position, P1. In particular, as depicted, the first polymer ring 51 makes contact with the seal ring 49 (and generates a face load on seal 50) before the second polymer ring 55 makes contact with the seal ring 49 (and generates an additional face load on seal 50). Additionally, as depicted, the second polymer ring 55 generates a face load greater than a face load generated by the first polymer ring 51. The face load, F1, is the total face load on the seal 50 (generated by both the first polymer ring 51 and the second polymer ring 55 while in an assembled state) when the roller cone 16 is mounted on the pin 15. It should be appreciated that the face load, F1, as depicted in FIG. 6, is on around the same face load, F1, as depicted in FIG. 7. In other words, although first polymer ring 51 and second polymer ring 55 may have different properties/features (e.g., geometry and hardness) than respective conventional first polymer rings and second polymer rings, the face load, F1, exerted on seal 50 may be similar or the same as a face load generated by conventional first polymer rings and second polymer rings.

The embodiments of the disclosure described above and illustrated in the accompanying drawing figures do not limit the scope of the invention, since these embodiments are merely examples of embodiments of the invention, which is defined by the appended claims and their legal equivalents. Any equivalent embodiments are intended to be within the scope of this disclosure. Indeed, various modifications of the present disclosure, in addition to those shown and described herein, such as alternative useful combinations of the elements described, may become apparent to those skilled in the art from the description. Such modifications and embodiments are also intended to fall within the scope of the appended claims and their legal equivalents.

What is claimed is:

1. An earth-boring rotary tool comprising:
a body comprising at least one pin;
at least one roller cone mounted on the at least one pin and configured to rotate about the at least one pin during use of the earth-boring rotary tool; and
at least one seal assembly disposed between the at least one pin and the at least one roller cone, the at least one seal assembly comprising:
a seal ring configured to remain stationary with respect to rotation of the at least one roller cone, the seal ring comprising a distal surface proximate a surface of the at least one roller cone to form a seal between the distal surface of the seal ring and the surface of the at least one roller cone, wherein the seal ring is comprised of a metal;
a first polymer ring disposed radially inward the seal ring, the first polymer ring configured to remain stationary with respect to rotation of the at least one roller cone and, while compressed in a non-use state, applying a first force on the seal ring that biases the distal surface of the seal ring towards the surface of the at least one roller cone; and
a second polymer ring adjacent a proximal surface of the seal ring, the second polymer ring configured to remain stationary with respect to rotation of the at least one roller cone and, while compressed in the non-use state, applying a second force on the seal ring that biases the distal surface of the seal ring towards the surface of the at least one roller cone, wherein a ratio of the second force to the first force is greater than 1:1 and less than 3:1.

2. The earth-boring rotary tool of claim 1, wherein a ratio of a second slope of the second force versus translation of the seal to first slope of the first force versus translation of the seal is from 5:1 to 15:1.

3. The earth-boring rotary tool of claim 1, wherein a ratio of a the second slope of the second force versus translation of the seal to a first slope of the first force versus translation of the seal is greater than 4:1.

4. The earth-boring rotary tool of claim 1, wherein a ratio of a cross-sectional area of the first polymer ring to a cross-sectional area of the second polymer ring is from 1.5:1 to 1.9:1.

5. The earth-boring rotary tool of claim 1, wherein a cross-section of the first polymer ring, while in an uncompressed state, is circular, and a cross-section of the second polymer ring, while in an uncompressed state, is non-circular.

6. The earth-boring rotary tool of claim 1, wherein the surface of the at least one roller cone comprises a surface of an insert ring configured to rotate with the at least one roller cone, wherein the insert ring is a metal insert ring.

7. The earth-boring rotary tool of claim 1, wherein the first polymer ring and the second polymer ring comprise the same material.

8. The earth-boring rotary tool of claim 7, wherein the same material is one of hydrogenated nitrile butadiene rubber (HNBR), perfluoroelastomer (FFKM) or fluoroelastomer (FKM).

9. An earth-boring rotary tool, comprising:
a body comprising at least one pin;
at least one roller cone mounted on the at least one pin and configured to rotate about the at least one pin during use of the earth-boring rotary tool; and
at least one seal assembly disposed between the at least one pin and the at least one roller cone, the at least one seal assembly comprising:
a seal ring configured to remain stationary with respect to rotation of the at least one roller cone, the seal ring comprising a distal surface proximate a surface of the at least one roller cone to form a seal between the distal surface of the seal ring and the surface of the at least one roller cone;
a first polymer ring disposed radially inward the seal ring, the first polymer ring configured to remain stationary with respect to rotation of the at least one roller cone and while compressed in a non-use state, applies a first force to bias the distal surface of the seal ring towards the surface of the at least one roller cone; and
a second polymer ring proximate the first polymer ring, wherein the second polymer ring while compressed in a non-use state, applies a second force to further bias the distal surface of the seal ring towards the surface of the at least one roller cone,
wherein a ratio of a second slope of the second force versus translation of the seal to a first slope of the first force versus translation of the seal is greater than 4:1.

10. The earth-boring rotary tool of claim 9, wherein a ratio of a cross-sectional area of the first polymer ring to a cross-sectional area of the second polymer ring is from 1.5:1 to 1.9:1.

11. The earth-boring rotary tool of claim 9, wherein the first polymer ring and the second polymer ring comprise the same material.

12. The earth-boring rotary tool of claim 11, wherein the same material is one of hydrogenated nitrile butadiene rubber (HNBR), perfluoroelastomer (FFKM) or fluoroelastomer (FKM).

13. The earth-boring rotary tool of claim 9, wherein the surface of the at least one roller cone comprises a surface of an insert ring configured to rotate with the at least one roller cone.

14. The earth-boring rotary tool of claim 9, wherein a ratio of the second force to the first force is greater than 1:1 and less than 3:1.

15. The earth-boring rotary tool of claim 14, wherein a range of the ratio of the second slope of the second force versus translation of the seal to the first slope of the first force versus translation of the seal is from 5:1 to 15:1.

16. A method of mounting a roller cone on a body of an earth-boring rotary tool, comprising:
    disposing a first polymer ring, a second polymer ring and a seal ring in a cavity between a roller cone and pin of a earth-boring rotary tool, wherein the first polymer ring is disposed radially inward the seal ring and wherein the second polymer ring is disposed proximate a proximal surface of the first polymer ring and a proximal surface of the seal ring;
    translating a roller cone towards the pin along an axis of the pin to mount the roller cone on the pin; and
    in response to the translating:
        compressing the first polymer ring against the seal ring, wherein the compressing of the first polymer ring generates a first force applied on the seal ring that biases a distal surface of the seal ring towards an internal surface of the roller cone to form a seal between the distal surface of the seal ring and the internal surface of the roller cone; and
        compressing the second polymer ring against the seal ring, wherein the compressing of the second polymer ring generates a second force applied on the seal ring that biases the distal surface of the seal ring towards the internal surface of the roller cone to further form the seal between the distal surface of the seal ring and the internal surface of the roller cone, wherein a ratio of the second force to the first force is greater than 1:1 and less than 3:1.

17. The method of claim 16, wherein the compressing the first polymer ring against the seal ring further comprises:
    compressing the first polymer ring against an inner surface of the seal ring.

18. The method of claim 16, wherein the compressing the second polymer ring against the seal ring further comprises:
    compressing the second polymer ring against a proximal surface of the seal ring.

\* \* \* \* \*

UNITED STATES PATENT AND TRADEMARK OFFICE
CERTIFICATE OF CORRECTION

PATENT NO. : 11,131,148 B2
APPLICATION NO. : 16/455229
DATED : September 28, 2021
INVENTOR(S) : Gregory L. Ricks Page 1 of 1

It is certified that error appears in the above-identified patent and that said Letters Patent is hereby corrected as shown below:

In the Claims
    Claim 2,    Column 9,    Line 58,    change "to first" to --to a first--
    Claim 3,    Column 9,    Line 61,    change "of a the second" to --of a second--

Signed and Sealed this
Twenty-sixth Day of October, 2021

Drew Hirshfeld
*Performing the Functions and Duties of the*
*Under Secretary of Commerce for Intellectual Property and*
*Director of the United States Patent and Trademark Office*